Sept. 17, 1963  E. WIEGER  3,103,754
REMOVING AND LOADING DEVICE
Filed Aug. 3, 1960  4 Sheets-Sheet 1
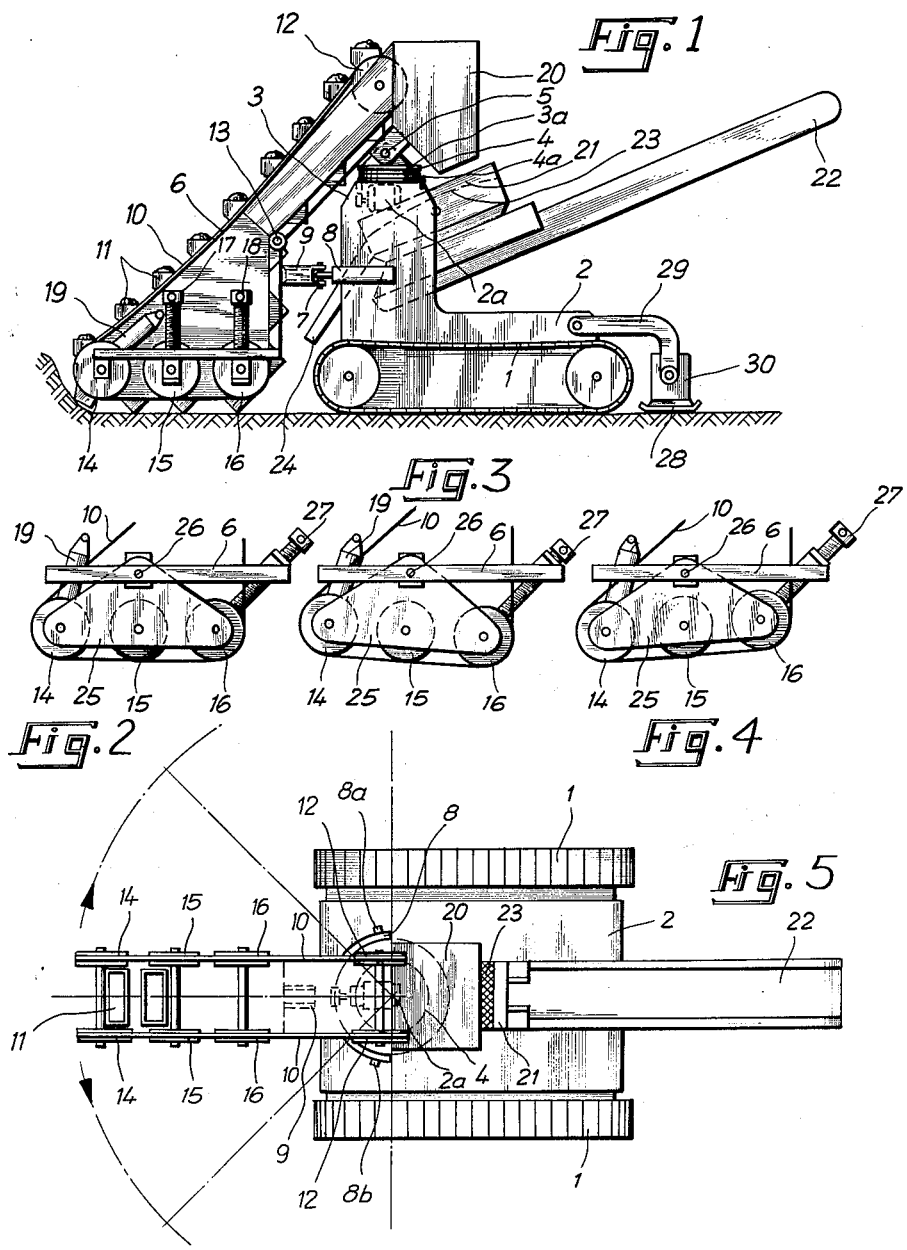

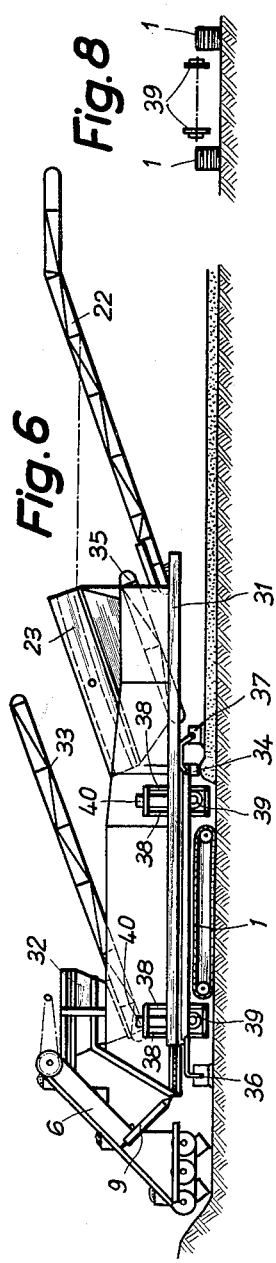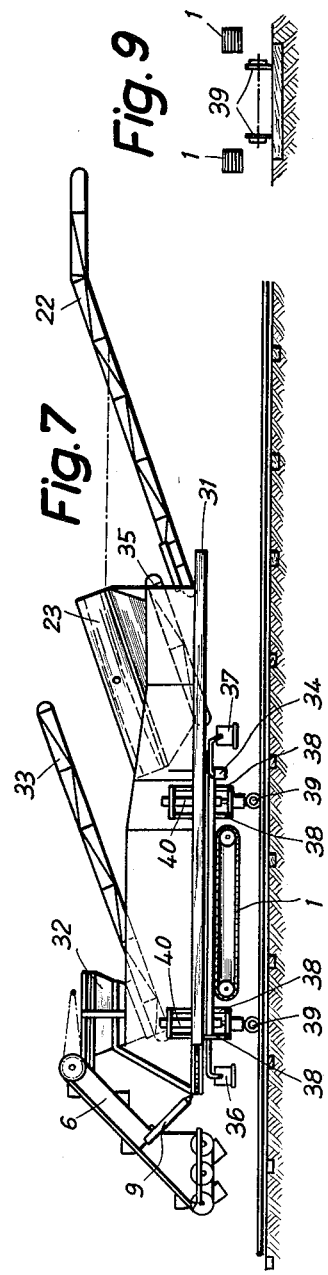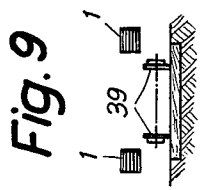

Sept. 17, 1963 E. WIEGER 3,103,754
REMOVING AND LOADING DEVICE
Filed Aug. 3, 1960 4 Sheets-Sheet 4
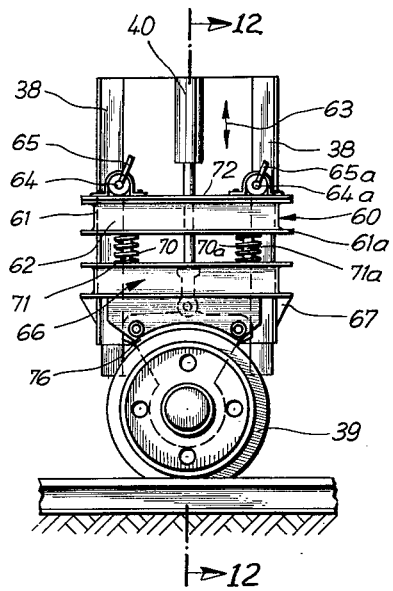
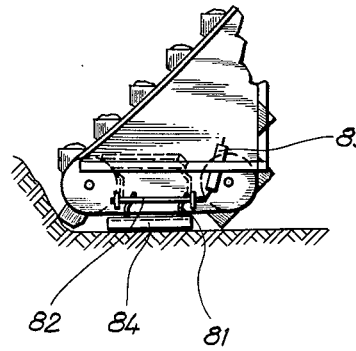
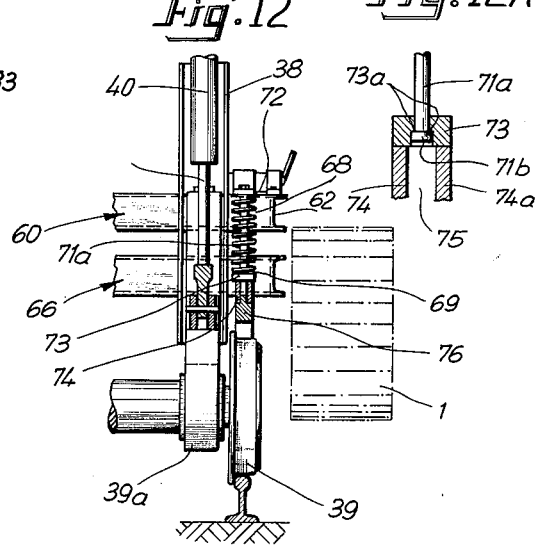
INVENTOR.
ERNST WIEGER
BY United States Patent Office 3,103,754
Patented Sept. 17, 1963

3,103,754
REMOVING AND LOADING DEVICE
Ernst Wieger, Budericher Strasse 13,
Neuss (Rhine), Germany
Filed Aug. 3, 1960, Ser. No. 47,273
11 Claims. (Cl. 37—192)

In many work operations, such as mining, flowable material such as gravel, cinders, coal, crushed rock, or earth is to be moved and, frequently bucket dredges or grab bucket conveyors are employed for conveying the material to trucks or carts. However, when the material is to be transferred to belt conveyors or is to be passed to a sifting or screening device, it is necessary to provide intermediate bins with charging devices when employing dredges or conveyors of the above mentioned type.

Mining and loading devices having continuous conveyors are also known according to which the material is moved by means of a bucket type conveyor. Such loading devices are equipped with a frame or carriage which may be provided with supporting endless tracks. In order to be able to carry out a work operation extending over a width greater than the width of the bucket system, lateral worms are provided extending on both sides of the bucket conveyor. These are of opposite band and run in the same direction and the material is dislodged and moved thereby to the bucket conveyor from both sides. The feeding worms have to be very strong inasmuch as they are subjected to extremely heavy service. The worms, nevertheless, wear out very rapidly and are expensive to replace.

It is, therefore, an object of the present invention to provide a mining or material moving and loading device which will overcome the above mentioned drawbacks.

It is another object of this invention to provide a displaceable mining and loading device with an endless track carriage carrying a bucket conveyor, which will not require lateral feeding worms but which will be able to work over a width in excess of the width of the device.

These and other objects and advantages of the invention will appear more clearly from the following specification in connection with the accompanying drawings, in which:

FIG. 1 is a side view of a device according to the invention having a plurality of its lower conveyor chain supporting rollers adjustable individually.

FIGS. 2 to 4 are side views diagrammatically illustrating the lower portion of a bucket conveyor system, in which the lower supporting rollers are mounted in a tiltable rocker, said figures respectively showing said rocker in different positions.

FIG. 5 is a top view of the mining and loading device shown in FIG. 1.

FIG. 6 is a side view illustrating a modified device according to the invention for cleaning and planing railroad beddings, the arrangement of FIG. 6 being shown supported on endless support tracks.

FIG. 7 illustrates the arrangement of FIG. 6 supported on wheels for movement on rails.

FIGS. 8 and 9 diagrammatically illustrate the driving mechanism of the machine in both operating positions as seen from the front.

Figure 10:
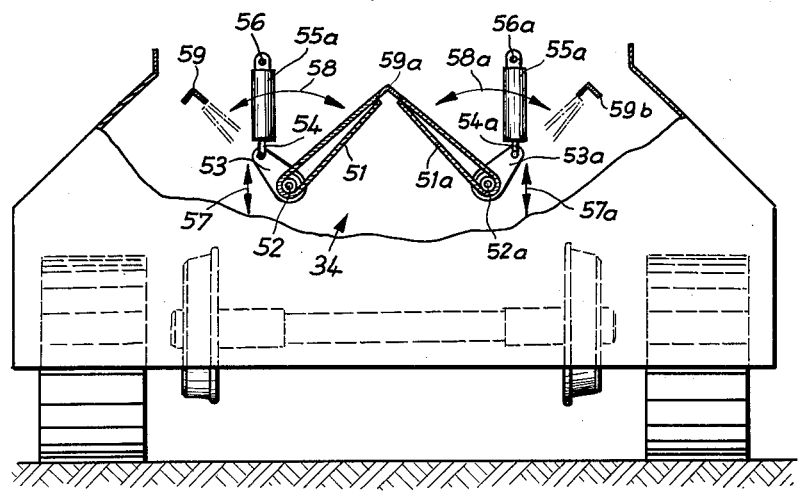

FIG. 10 diagrammatically illustrates the discharge passage with guiding flaps.

FIG. 11 is a diagrammatic side view of the braking device associated with the wheels of the mining and loading device according to the invention.

FIG. 12 is a section taken along the line XII—XII of FIG. 11.

FIG. 12A is a fragmentary view showing the construction of FIG. 12 at an enlarged scale.

Figure 13:
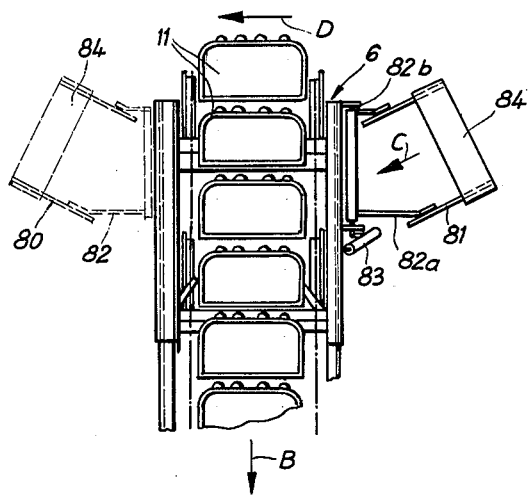

FIG. 13 illustrates the front end of the bucket frame with a lateral rake.

FIG. 14 is a side view of a rake arrangement at the roller end of the pocket frame.

*General Arrangement*

The invention is characterized primarily in that the bucket conveyor supporting frame is turnable about a vertical axis on the carriage in such a way that by turning the said frame, the mechanism can be caused to work over not less than the width of the carriage.

In addition to mining or quarrying pourable goods from dumps, the arrangement according to the invention may also be employed for working ground above or below the surface. In order in such instances to assure an optimum working of the ground, the device of the present invention is advantageously so designed that the lower part of the bucket conveyor mechanism has at least two supporting rollers by means of which the chains of the bucket conveyor are guided, at the lower part of the mechanism, in a substantially horizontal direction.

In order to be able selectively to adjust the bucket system in conformity with the type of the material being worked so that the buckets carry out their scooping action from below or from above, the device according to the present invention may be so designed that the bucket mechanism will be adjustable in the vertical direction about a horizontal axis. Also at least one of the lower bucket chain supporting rollers will be adjustable in such a way that the bucket chains, when passing along their lower path, will be guided horizontally or along an incline. A particularly simple construction of the adjusting mechanism will be obtained by arranging the lower chain supporting rollers in a rocker tiltably journalled on the frame of the bucket conveyor. The tilting axis of the rocker is preferably so arranged that the tilting of the rocker will not require an elongation or shortening of the bucket chains.

When the device is employed for working natural soil, either above or below ground, it is advisable to provide a vibrator, preferably connected to the rocker, for vibrating the rocker to thereby increase the working effect of the buckets carried by the bucket chains.

In many instances, it is desired to compact the surface of the soil after its upper layer or layers have been scooped up. For this purpose, a compacting device such as a vibrator with a plank or board is suspended on the carriage of the device at that side thereof which is opposite to the side carrying the bucket mechanism. The said plank or board may be adapted to be lifted by tiltable lever arms attached thereto. This arrangement is particularly suitable for the building of roads and railroad beds.

Inasmuch as the prime mover as well as the transformer and electric motors of the device require some space, the carriage has a somewhat elongated design. An advantageous design of the machine for cleaning and grading railroad beddings will be obtained by providing a belt conveyor for conveying the material scooped up by the buckets to a sifting or screening device arranged at the other end of the carriage. The sifted-out or screened material will be discharged behind the driving means of the carriage to the ground. The larger material which does not pass through the screen will then be carried, by means of a conveyor, to a loading position, or will be discharged off toward the side. If such a machine is equipped with a second compacting device toward the rear of the carriage for compacting the soil scooped up by the buckets, the screened-out road material or gravel will drop on the already compacted ground surface and will then subsequently be further compacted by the second compacting device at the rear end of the carriage. In this way, a road bedding will be obtained which will meet the highest requirements.

Since the weight of the device is rather great and the driving speed when supported on rails may be considerable, it is necessary to have a relatively high braking force available immediately when the device is operated as a rail vehicle. This high braking force is produced by the weight proper of the device. To this end, braking devices are employed which cooperate with hydraulic cylinder piston systems for adjusting the wheel bearings and which comprise a frame adjustable as to height and arrestable in its respective position, said frame carrying the braking elements and springs therefor.

With devices of the nature with which this invention is concerned and equipped with a bucket supporting frame, it is desirable to be able to enlarge the working width without having to increase the turning range of said bucket system supporting frame because an increase in this turning range would require additional means for increasing the stability and steadiness of the device.

According to a further feature of the present invention, the front end of the bucket system supporting frame is equipped with lateral rakes adapted to be raised and lowered and arranged at an angle with regard to the conveying direction of the bucket conveyor. By means of these rakes it is possible to gather material which is located laterally of the frame when said frame occupies its outermost turned position.

For purposes of distributing the cleaned crushed rock or the like over the width of the surface when the device is employed for cleaning and grading of track beds, there is provided a guiding flap system by means of which the cleaned crushed rock is selectively discharged at the edges or in the center portion of the discharging means.

*Structural Arrangement*

Referring now to the drawings in detail, the arrangement shown therein comprises a carriage 2 equipped with endless support tracks 1 and supporting a column-like structure 3. The column-like structure 3 carries a turntable 4 which in its turn carries a bearing 5. The bearing 5 has tiltably suspended thereon the bucket system supporting frame 6 which, by means of a roller 7, rests against a rail 8 which extends in a semicircular manner about the column or column-like structure 3. In this way, the frame 6 is held in its proper position. The distance between the roller 7 and the bucket frame 6 may be varied by means of a hydraulic cylinder piston system 9 so that the inclination of the frame 6 and thus the level of its lower end may be adjusted in conformity with the respective requirements.

The arrangement shown in the drawings furthermore comprises bucket chains 10 carrying buckets 11. The said bucket chains 10 are passed over upper supporting rollers 12, intermediate supporting rollers 13 and lower supporting rollers 14, 15, 16. Whereas the lower rollers 14 rest in fixed bearings, the bearings of the rollers 15, 16 are adjustable by means of threaded spindles 17, 18. In this way, the course or path of the bucket chains between the rollers 14 and 16 may be varied so that the lower path of the chains can be varied selectively to extend horizontally or at an incline in one or the other direction. The chain, of course, has slack therein either in the reach thereof between rollers 12 and 14 or between rollers 12 and 13. In FIGURE 1 this slack will be seen to be between rollers 12 and 14. The arrangement of the invention as shown in the drawing furthermore comprises a vibrator or shaking device 19 which is connected to the bearings of the rollers 14. As vibrator, any known vibrator system may be employed.

With the arrangement shown in the drawings, the material conveyed by the buckets 11 is delivered to a funnel 20 and passes therethrough to a charging device 21 which in its turn discharges the material upon a belt conveyor 22. This conveyor 22 including its charging device may be rigidly connected to the carriage 2 or may be tiltable about a vertical shaft. If it is desired, the charging device 21 may be provided with a sifting device or screen 23 by means of which the conveyed material will be classified. The conveyor 22 transports merely that material which has passed through said screen, whereas the material which does not pass through the screen 23 is conveyed to a chute 24 and is directly discharged at the quarrying or mining place.

With the embodiment shown in FIGS. 2 to 4, the lower part of the frame 6 has journalled therein a rocker 25, the rocking axis of which is designated with the reference numeral 26. The rocker 25 has the lower supporting rollers 14, 15 and 16 journalled therein. The rocker 25 may be adjusted by means of a threaded spindle 27 and may be moved from the horizontal position shown in FIG. 2 into the inclined position shown in FIG. 3 or into the oppositely inclined position shown in FIG. 4. The shaking device 19 will in this instance be connected to the rocker 25. Inasmuch as a tilting movement of the rocker 25 causes a change in the level of the lowermost point of the bucket system, it is necessary, when working at ground level, simultaneously with an adjustment of the rocker 25 to bring about a compensation by tilting the frame 6 by means of the hydraulic cylinder 9. In this way, the lowermost point of the bucket system will correspond to the ground level of the endless tracks 1.

As will be seen from FIG. 5, the bucket system may be swung laterally over a relatively wide range. In this way, it is possible to work over a width of the soil which is at least as wide as the width of the carriage 2. By correspondingly adjusting the supporting rollers 15, 16 (FIG. 1) or the rocker 25 (FIGS. 2 to 4), a proper planing working of the new soil surface can be effected.

For securing the frame 6 against unintentional turning, there is provided a stud 4a which extends through the turntable 4 into one of a plurality of bores which are arranged along a circle at the upper side 3a of the structure 3. The turning or tilting movement of the bucket frame from the position shown in FIG. 5 in the direction of the double arrow A to both sides is limited by abutments 8a and 8b on the semi-circular rail 8, said abutments being adapted to stop motor 2a in column-like structure 3 of carriage 2 which turns the turntable 4 and thereby the frame 6.

With the embodiment according to FIG. 1, the carriage 2 has suspended thereon, by means of two lever arms 29, a vibrator plank 28 which is adapted to be vibrated by a vibrator device 30 of any known type. By tilting lever arms 29 upwardly, plank 28 may be lifted. When the vibration plank 28 is in its working position, it will bring about a proper compacting of the soil surface as is desired when building streets and railroad beds. Instead of the plank 28, also other compacting devices known per se such as one or more drums or rollers may be provided.

The mining and loading device shown in FIGS. 6 to 9 is primarily intended for the cleaning and grading of railroad beds. Those parts corresponding to similar parts of the device according to FIG. 1 have been designated with the same reference numerals as used in connection with the description of FIG. 1. As will be seen from FIG. 6, the endless track 1 carries frame 31 overhanging toward the right with regard to the drawing which frame 31 forms simultaneously the carriage of the machine. The left end of frame 31 carries the bucket frame 6 which is adjustable by means of the hydraulic cylinder piston system 9. The bucket system transfers the mined material through a funnel 32 upon a belt conveyor 33 which in its turn transports the material to the sifting device or screen 23. The screened-out material drops through a chute 34 onto the ground. For purposes of laterally distributing the material, chute 34 may be provided with guides or guiding flaps to be described further below. The material which has passed through the screen is passed by a conveyor belt 35 to the belt conveyor 22 which is tiltably arranged on the right-hand end of frame 31 with regard to FIG. 6. The purpose of belt conveyor 22 consists in loading the material or laterally unloading the same. Frame 31 has arranged thereon a compacting device 36 arranged between the bucket system and the carriage for compacting the ground surface which has been scooped by the bucket system. Directly behind chute 34, frame 31 has arranged a second compacting device 37 by means of which the gravel passed through the screen 23 will be compacted or tamped.

As will be evident from FIG. 10, each of the guiding flaps 51, 51a in passage is tiltable from the position shown in full lines into the position shown in dash lines. Also turnable about pivots 52, 52a are levers 53, 53a, which are connected to said flaps. These levers are offset by 90° with regard to said flaps. The free end of each of said levers has connected thereto a piston rod 54, 54a of a hydraulic cylinder piston system 55, 55a which is tiltable at 56, 56a. When the piston rods move in the direction of the arrows 57, 57a, the guiding flaps turn in the direction of the double arrows 58, 58a. When the flaps 51, 51a occupy their end positions, they are in alignment with angles 59, 59a, 59b.

In order to allow employment of the above mentioned machine on rails, frame 31 has connected thereto vertical guiding means in which the bearings or wheels 39 are adjustable by hydraulic cylinder piston systems 40. By means of these hydraulic cylinder piston systems 40, the wheels 39 may be pressed downwardly so that the entire machine will be lifted until the endless track 1 are at the level corresponding to the level of ordinary railroad profile or structural elements. This position is shown in FIGS. 7 and 9. By means of well-known hydraulic systems, it will be assured that the hydraulic cylinder piston systems 40 will operate uniformly and that no tilting or the like will occur when the machine is lifted.

The device for braking the mining and loading device of the present invention when said mining or loading device is employed as a rail vehicle, comprises a frame 60 with four legs or guides 38 for a wheel set. A device resting on four wheels thus has two of such frames 60. Each of these frames 60 of which one is shown in FIGS. 11 and 12, comprises two parallel structural members 61 and two parallel structural members perpendicular thereto of which only the structural member 62 is shown in the drawings. Frame 60 is displaceable in the direction of the double arrow 63 along the four vertical guides 38. The frame may be arrested relative to the legs 38 by means of two bolts 64, 64a provided with handles 65, 65a. Below the displaceable frame 60 there is provided a similar frame 66 fixedly connected to guides 38 for instance by the angles or brackets 67.

As will be evident from FIG. 12, between the structural members 62 of the upper displaceable frame 60 and the guides 38 there is left a space 68. A similar space is provided between the guides 38 and those parts of frame 66 which are located below the structural members 62. In these spaces there are arranged two braking springs 70, 70a guided by bolts 71, 71a respectively. The upper end of each of said bolts is connected to the structural member 72 which closes the upper portion of the space 68. The lower ends of bolts 71, 71a are provided with a reinforcement 71b guiding the spring plate 73. The reinforcement 71b rests against the shoulders 73a of the spring plate having mounted thereon two bars 74, 74a spaced from each other while the heads 71b of the bolts 71, 71a are adapted to extend through the spacing 75 between said bars 74, 74a. A brake shoe 76 is mounted on bars 74, 74a. The operation of this braking device will now be described.

The operation of the braking system of the device according to the invention, when the latter is employed as rail vehicle, is as follows. The cylinder 40 lowers the wheel bearing 39a of wheels 39 through the intervention of piston rod 40a into the position shown in FIGS. 11 and 12. When lowering the wheels 39, also the brake shoe 76 and thus frame 60 freely displaceably mounted on guides 38, will be lowered. Shortly before reaching their lowermost position, the wheels 39 will be briefly arrested during the downward movement and frame 60 will be arrested with regard to the guides 38 by locking it to guides 38 by means of lock bolts 64, 64a which are actuated by their handles 65, 65a. Thereupon, the wheels will be further lowered to their final position shown in FIGS. 11 and 12. If a braking action is desired, the upper ends or hydraulic cylinders 40 are vented so that the device will be lowered and the braking shoes will engage wheels 39. First the braking shoes will be acted upon by springs 70 and 70a. When the lowering action is continued, i.e. when the cylinders 40 are further vented, heads 71b of bolts 71, 71a engages the braking shoe so that now the full weight of the device will be able directly to act upon the wheels 39 without the intervention of a spring.

When instead of wheels 39 it is intended to employ the endless tracks 1, frame 60 is detached and the wheels are lifted to such an extent that the tracks can become effective and carry the device. During the raising of the wheels, the latter also lift the braking shoe and frame 60.

The device for increasing the loading width without an increase in the turning range of the bucket frame is shown in FIGURES 13 and 14. The bucket frame 6 having mounted thereon the individual buckets 11 is laterally of and at an angle to the conveying direction of the bucket system (arrow B) provided with two rakes 80 and 81. One of these two rakes, in the present instance the left rake 80, has been indicated by dot-dash lines which is intended to indicate that depending on the desired mining width, in some instances one rake only will suffice.

The rakes comprise a leg 82, 82a arranged on the bucket frame and tiltable about shaft 82b by means of a pressure fluid system 83. The front end of the rake leg has at an angle thereto provided the rake blade 84 which grasps the material and conveys the same in the direction of the arrow C when the bucket frame is turned in the direction of the arrow D. For purposes of grasping the material, the rake with its blade 84 is lowered whereas during the turning of the bucket frame in a direction opposite to the arrow D, it is lifted so that it passes over the material. When turning the bucket frame in a direction opposite to the arrow D, the bucket frame will grasp the material moved by the rake 84 in the direction of the arrow C and will convey the same away.

The machine shown in FIGS. 6 to 9 operates as follows. After the machine shown in FIG. 7 has been previously moved on rails to its place of employment, the hydraulic cylinder piston system 40 will, following the detachment of the mechanical locking means be controlled for lowering the machine so that the wheels 39 are lifted and the machine will rest upon its endless tracks 1. By driving the endless tracks 1, the machine may now be advanced. Thereupon, on the spot, the gravel to be screened and intended for the railroad bedding is passed by the bucket frame 6 through funnel 32 and by means of belt conveyor 33 onto the sifting device or screen 23. This device brings about a classification so that only screened gravel of corresponding size will pass through chute 34 onto the ground. The smallest gravel particles such as dust, soil and the like which drop through the screen will be conveyed by conveyor belt 35 to the belt conveyor 22 and will be loaded or thrown toward the sides of the railroad bed.

While the bucket frame 6 slowly moves back and forth in lateral direction, the machine gradually advances. The scooped soil will be compacted by the compacting device 36. The screened gravel which has passed downwardly through chute 34 will likewise be compacted during the advance of the machine, said compacting being effected by means of the compacting device 37. Thus, a very compacted railroad bedding will be obtained which is suitable for high loads.

When the machine is to be transported to another place, it will, by means of the endless tracks 1, be moved over the rails. Thereupon by means of the hydraulic cylinder piston systems 40, wheels 39 are pressed downwardly so that the machine is again lifted into the positions shown in FIGS. 7 and 9.

It is, of course, to be understood that the present invention is, by no means, limited to the particular constructions shown in the drawings but also comprises any modifications within the scope of the appended claims.

What I claim is:

1. In an apparatus for mining, quarrying and loading: a carriage, movable bucket means for digging into and scooping up the ground to be removed, a frame carrying said bucket means and supported by said carriage, a turntable supporting said frame and being supported on and turnable on the carriage at the upper end thereof about a substantially vertical axis, chain means in the frame drivingly interconnecting said bucket means and operable to move the same, a plurality of chain guiding roller means near the lower end of said frame and adjustable in the frame for selectively guiding said chain means along a horizontal plane or at an angle thereto, a horizontal pivot connecting said frame to said turntable for tiltably supporting said frame, a vertical semi-circular track on the carriage beneath the said horizontal pivot and concentric with said vertical axis, a roller engaging the track, and expansible fluid operable means movably connecting the roller to the frame for movement of the frame toward and away from said track.

2. In an apparatus for mining, quarrying and loading: a carriage, movable bucket means for digging into and scooping up the ground to be removed, a frame carrying said bucket means, a turntable rotatably supported by said carriage at the upper end thereof, said turntable being turnable on the carriage about a substantially vertical axis, chain means in the frame drivingly interconnecting said bucket means and operable to move the same, a plurality of chain guiding roller means near the lower end of said frame and adjustable for selectively guiding said chain means along a horizontal plane or at an angle thereto, rocker means carrying said roller means and tiltably supported in the frame for tilting said roller means selectively into a horizontal plane or inclined plane position, horizontal pivot means connecting the frame to the turntable, and tilting means bearing between the frame and the carriage for tilting the frame on the turntable, said tilting means comprising a fluid motor connected at one end to the frame and having a roller at the other end, and an arcuate track on the carriage engaging said roller.

3. An arrangement according to claim 2, in which said rocker means is triangular and carries two of said chain guiding roller means at vertices thereof while being tiltably supported in the frame at the third vertex thereof above and between said two chain guiding roller means for tilting movement of the rocker means while said chain means remains constant as to its length.

4. An arrangement according to claim 3, in which there are means connected between the frame and one end of the rocker means for tilting the rocker means in the frame while a vibration device is connected to the other end of the rocker means to vibrate the same.

5. An arrangement according to claim 3, in which there are means connected between the frame and one end of the rocker means for tilting the rocker means in the frame while a vibration device is connected to the other end of the rocker means to vibrate the same, and said rocker means having a third chain supporting roller means therein intermediate said two chain supporting roller means.

6. In an apparatus for mining, quarrying and loading: a carriage, movable bucket means for digging into and scooping up the ground to be removed, a frame carrying said bucket means and supported by said carriage, a turntable having horizontal pivot means connected to said frame, said turntable being turnable on the carriage about a substantially vertical axis, means bearing between said frame and said carriage for tilting the frame about said pivot means, chain means in said frame attached to said bucket means and operable to move the same, a plurality of chain guiding roller means near the lower end of said frame and adjustable for selectively guiding said chain means along a horizontal plane or at an angle thereto, rocker means in the frame carrying said roller means and tiltable in the frame for tilting said roller means selectively into a horizontal plane or inclined plane position, and vibrating means connected to said rocker means and acting upon said chain means for increasing the tearing force of said bucket means.

7. In an apparatus for mining, quarrying and loading: a carriage provided with endless tracks for supporting and moving the same, movable bucket means for digging into and scooping up the ground to be removed, first frame means carrying said bucket means, a turntable having horizontal pivot means connected to said first frame means and supported by said carriage, said turntable being turnable on the carriage about a substantially vertical axis, railway wheels associated with said carriage for selectively enabling said apparatus to drive on rails, guiding means extending in a substantially vertical direction and supported by said carriage, bearing means adjustably guided in said guiding means and supporting said railway wheels, fluid operable cylinder piston means supported by said carriage and operatively connected to said bearing means for adjusting the same in a vertical direction whereby said wheels may selectively be lowered below the lowest level of said endless tracks to permit said apparatus to drive on rails, second frame means adjustable in height and mounted on said guiding means, means for selectively locking said second frame means in its respective adjusted position to said guiding means, brake shoes movably supported by said second frame means for engagement with said railway wheels upon relative upward movement of the wheels, and spring means in said second frame means acting an said brake shoes.

8. An apparatus according to claim 7, which includes spring plates arranged at the lower ends of said spring means and also includes bolts extending through said spring plates and guiding said spring means, and means connected to the lower end of said bolts for carrying said spring plates.

9. In an apparatus for mining, quarrying and loading: a carriage, movable bucket means for digging into and scooping up the ground to be removed, frame means carrying said bucket means and supported by said carriage, said frame means being turnable about a substantially vertical axis on said carriage means through an angle covering at least the width of said carriage, rake means supported on horizontal axes on said frame means and arranged laterally of the frame means, and means for selectively lifting and lowering said rake means on said frame means about said axes to move material into position to be engaged by said bucket means.

10. An apparatus according to claim 9, in which said rake means comprises a rake blade arranged at an angle to the longitudinal axis of the frame, and fluid operable means operatively connected to said rake means for actuating the same.

11. In an apparatus for mining, quarrying and loading: a carriage, a vertical column fixedly supportingly mounted on the carriage, movable bucket means for digging into and scooping up the ground to be removed, a frame extending outwardly from the column and carrying said bucket means, a horizontal turntable rotatable on the upper end of the column for movement about a substantially vertical axis, horizontal pivot means connecting the frame in the region of the upper end thereof to the turntable for movement of said frame in a vertical plane, a track on the carriage a substantial distance beneath said turntable, and expansible fluid operable means connected to the frame and extending in a substantially horizontal direction toward said carriage and movably bearing on the track to tilt the frame about said horizontal pivot means while permitting movement of the frame together with said turntable on said vertical axis, said turntable permitting movement of the frame through a horizontal angle such that the outer end of the frame covers a distance at least equal to the width of the carriage.

References Cited in the file of this patent

UNITED STATES PATENTS

| | | |
|---|---|---|
| 329,465 | Mallinckrodt | Nov. 3, 1885 |
| 709,199 | Brown | Sept. 16, 1902 |
| 884,960 | Suiter | Apr. 14, 1908 |
| 964,567 | Seberg et al. | July 19, 1910 |
| 978,908 | Leary | Dec. 20, 1910 |
| 1,004,997 | Crawford | Oct. 3, 1911 |
| 1,078,234 | Wyckoff | Nov. 11, 1913 |
| 1,185,834 | Scalzitti | June 6, 1916 |
| 1,313,217 | Jackson | Aug. 12, 1919 |
| 1,392,069 | McDermott | Sept. 27, 1921 |
| 1,903,672 | Hauge | Apr. 11, 1933 |
| 1,997,037 | Barber | Apr. 9, 1935 |
| 2,031,279 | Newman | Feb. 18, 1936 |
| 2,201,493 | Jorgensen | May 21, 1940 |
| 2,228,445 | De Velbiss | Jan. 14, 1941 |
| 2,309,712 | Philbrick | Feb. 2, 1943 |
| 2,597,036 | Roe | May 20, 1952 |
| 2,962,822 | Roe | Dec. 6, 1960 |

FOREIGN PATENTS

| | | |
|---|---|---|
| 160,633 | Great Britain | Mar. 31, 1921 |
| 161,015 | Great Britain | Apr. 7, 1921 |
| 705,967 | Germany | May 15, 1941 |